Dec. 12, 1967   R. C. BAYES ETAL   3,357,143
SNAP FITTED PLASTIC GUTTERING JOINT

Filed May 27, 1965   2 Sheets-Sheet 1

INVENTORS
RONALD CURTIS BAYES,
DAVID HAROLD SANDS,

BY Woodhams Blanchard Flynn
ATTORNEY

Dec. 12, 1967  R. C. BAYES ETAL  3,357,143
SNAP FITTED PLASTIC GUTTERING JOINT
Filed May 27, 1965  2 Sheets-Sheet 2

INVENTOR
RONALD CURTIS BAYES,
DAVID HAROLD SANDS,

BY Woodhams Blanchard & Flynn
ATTORNEY

# United States Patent Office 3,357,143
Patented Dec. 12, 1967

3,357,143
SNAP FITTED PLASTIC GUTTERING JOINT
Ronald Curtis Bayes, Ware, and David Harold Sands, Ashford, Kent, England, assignors to The Ruberoid Company Limited, London, and Chemidus Plastics Limited, Ashford, Kent, England, British companies
Filed May 27, 1965, Ser. No. 459,341
Claims priority, application Great Britain, May 27, 1964, 2,888/64
6 Claims. (Cl. 52—11)

ABSTRACT OF THE DISCLOSURE

A gutter joint comprising a mounting plate, a bracing member and a seating portion adapted to receive therein adjacent ends of plastic guttering. The ends of the seating portion are of greater radius than the intermediate portion and have a sealing gasket disposed therein. The adjacent ends of two lengths of guttering are held in the seating portion by means of inwardly extending lips on opposite sides thereof, which lips are also provided with downwardly extending ears. With the two lengths of guttering positioned in the seating portion, a plastic sealing member is flexed into position under the downwardly extending ears to rest with its underface overlapping the adjacent ends of the two gutter lengths.

---

The invention relates to plastics guttering and is particularly concerned with a method of joining together, and an assembly capable of joining together, sections of guttering to provide a continuous leak-free gutter.

Lengths of plastics guttering are at present joined together to provide a continuous gutter by use of plastics union brackets. However, it is found that the joints so formed have a tendency to leak when undue forces are exerted on them. The forces encountered can be developed in various ways, for example, by foreign bodies, such as sand granules, entering the joint, movement of the guttering with respect to the bracket or inaccuracy in the lining up of the lengths of guttering to be joined. Further forces are exerted on the joint that are caused by the high co-efficient of thermal expansion of the plastics material from which the guttering is made, and this force, especially when the aforementioned conditions are present, can break the seal of the joint in the bracket and so cause a serious leak.

It is an object of the present invention to provide a method of joining together lengths of plastics guttering to form a continuous leak-free gutter.

It is a further object of the present invention to provide an assembly for joining opposing ends of lengths of plastics guttering to form a continuous leak free gutter.

According to the present invention there is provided a method of joining opposing ends of lengths of plastics guttering in which said ends are located within a middle portion of a plastics union bracket with a plastic gasket lying between each gutter and an enlarged end portion of the bracket, the marginal end portions of each gutter length being held firmly against the middle portion of the bracket by a flexible plastics sealing member sprung into position to lie within the bracket and to overlie both gutter end portions.

Further according to the invention there is provided guttering consisting of a plastics union bracket with a wall plate, a bracing member supporting a semi-cylindrical seating portion, end portions for said seating portions of larger radius than the radius of the middle portion, a semi cylindrical plastics gasket seated therein, and inwardly extending lips and downwardly extending ears provided at the edges of the seating portion.

One embodiment of the invention will now be described, by way of example only, and with reference to the accompanying diagrammatic drawings, in which.

Figure 1:
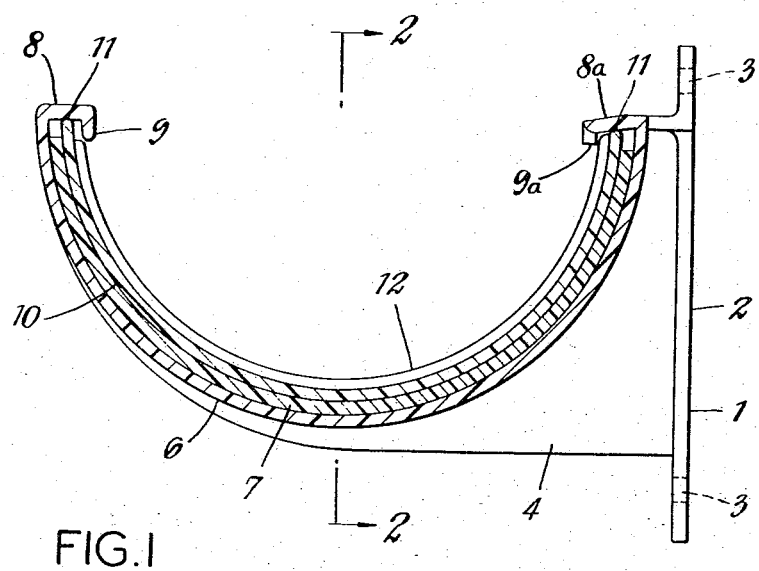
FIGURE 1 illustrates a cross-sectional view taken on the line 1—1 of FIGURE 2 of a length of guttering joined by an assembly according to the present invention.
Figure 2:
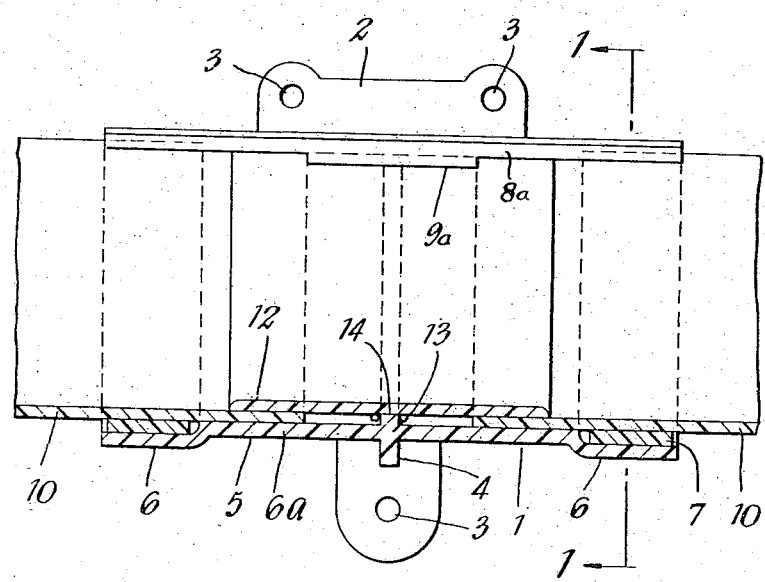
FIGURE 2 shows a cross-sectional view of the guttering and assembly shown in FIGURE 1, taken on the line 2—2 of FIGURE 1.

A plastics union bracket 1 has a wall plate 2 adapted to be secured to the surface of a wall by screws or bolts passing through three fastening holes 3. Extending perpendicularly from, and integral, with the wall plate 2 is a bracing member 4, which supports a semicylindrical seating portion 5. The seating portion 5 has its end portions 6 of larger radius than the radius of its middle portion 6a, such that semi-cylindrical plastics gaskets 7 can be seated therein. The gasket 7 can be made of, for example, neoprene.

The edges of the seating portion 5 which run parallel to the plane of the wall plate 2 are provided with retaining portions which can be in the form of inwardly extending lips 8 and 8a and downwardly extending ears 9 and 9a in the direction of the seating portion 5. It will be realised that the ears 9 and 9a can be omitted by providing the lips 8 and 8a with a recess or by inclining the lips downwardly towards the seating portion 5. The lengths of the lips 8 and 8a are preferably a substantial proportion of the length of the middle portion 6a. The ear 9 extends the full length of the bracket 1 and the ear 9a extends for only a short distance at the middle of the bracket.

In use, the union bracket 1 is secured to a wall by screws passing through the wall plate 2, the plane of the wall plate 2 lying in the same plane as the face of the wall, and the axis of curvature of seating portion 5 being at the desired angle to the horizontal. The semi-cylindrical plastics gaskets 7 are placed into the seats formed by the end portions 6 of the seating member 5.

The opposing ends of the two sections of plastics gutter 10 to be joined are then inserted into the seating portion 5 so that the concave surface of each of the gutters rests on the convex surfaces of the appropriate gasket 7 and the middle portion 6a.

The gutters 10 are anchored in the union bracket 1 by the securing effect developed by the pressure of the lips 8 and 8a applied on the edges 11 of the gutters.

A semi-cylindrical flexible plastics sealing member 12 is then clipped into position beneath the ears 9 and 9a such that the convex surfaces of the end portions of the gutters 10 are overlapped by the concave surface of the sealing member 12. The sealing member 12 is made from a suitable flexible material, for example, polyethylene.

In order to prevent movement of the sealing member 12 with respect to the bracket 1, which movement could be caused by undue movement of the gutter in the union bracket, locating means are associated with the sealing member. For the locating means shown in FIGURE 1 the concave surface of the middle portion 6a is provided with an arcuate rib 13, the rib 13 being of such dimensions as to fit into a complementary groove 14 on the convex surface of the sealing member 12.

Figure 3:
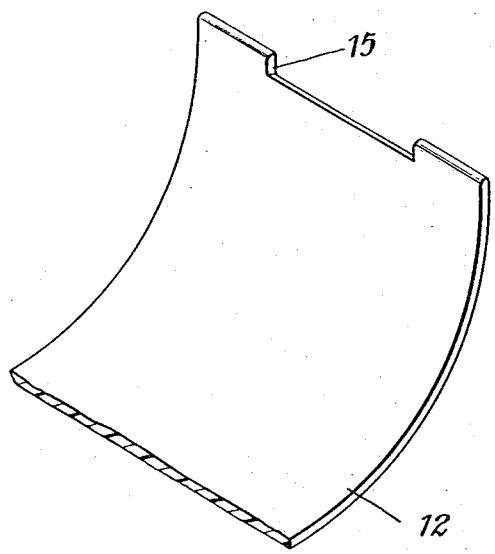
FIGURES 3 to 5 illustrate alternative means by which the flexible plastics sealing member can be located in the assembly to form the guttering joint.
Figure 4:
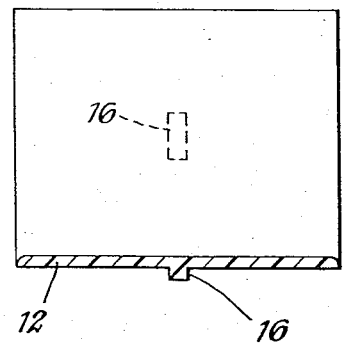
Figure 5:
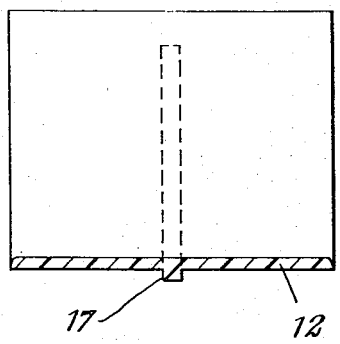

The FIGURES 3 to 5 show alternative locating means by which the sealing member 12 can be located within the union bracket 1. The sealing member shown in FIGURE 3 has its straight edges provided with indents or recesses such as at 15, the indents or recesses being of suitable dimensions to clip into complementary projections (not shown) on the wall of the union bracket and so locate the sealing member over the ends of the guttering sections 10. The sealing member 12 in FIGURE 4 is provided with a plurality of plugs or stub projections 16 which are so positioned as to enter into complementary sockets or recesses (not shown) or an arcuate groove on the concave surface of the middle portion 6a of the union bracket and again locate the sealing member over the ends of the guttering sections 10. Referring to FIGURE 5 it will be seen that the stub projections 16 have been replaced by an arcuate rib 17 on the convex surface of the sealing member 12 which rib would be located in an arcuate groove in the concave surface of the union bracket.

It can be seen that linear expansion of the guttering sections 10 can be accommodated within the bracket 1 by sliding movement of the guttering sections between the sealing member 12 and middle portion 6a, and providing the sealing member 12 is of sufficient length always to overlap the guttering end portions the leak-free joint will remain intact.

It will be understood that several modifications can be made to the gutter assembly as illustrated without departing from the scope of the present invention, for exmple the union bracket can be angled to provide a joint in two lengths of guttering in which the two sections of guttering extend from the bracket in a direction normal to each other, such as assembly could incorporate an angled sealing member and be suitable for use on the corners of a building.

We claim:

1. A guttering assembly comprising:
    a one-piece plastic union bracket consisting of a substantially semi-cylindrical seating portion, a wall plate portion for mounting said union bracket on a wall and a bracing means extending between said wall plate portion and said seating portion, said seating portion having end portions of larger radius than the central portion of said seating portion, said seating portion having a pair of inwardly extending lips extending substantially the entire length of the upper edges of said seating portion, downwardly extending ears extending downwardly from the inner ends of said lips, one of said ears extending the full length of its associated lip and defining therewith a first channel, the other ear extending only a part of the length of its associated lip at the central portion thereof and defining a second channel;
    a substantially semi-cylindrical plastic gasket seated in each end portion;
    two lengths of substantially semi-cylindrical plastic guttering extending into said seating portion at the opposite ends thereof and having their adjacent ends spaced apart and overlying the central portion of said seating section, said lengths each overlying and sealingly contacting one of said gaskets and extending therebeyond into sliding contact with the central portion of said seating portion, one of the upper edges of said lengths of guttering extending into said first channel for being held in place thereby; and
    a flexible plastic bridging member of substantially semi-cylindrical cross section disposed within said central portion of said seating portion overlying and engaging the adjacent ends of said lengths of guttering and bridging the space therebetween, the upper edges of said bridging member extending to said channels for being retained in place thereby.

2. A guttering assembly according to claim 1, in which the central portion of said seating portion and the central portion of said sealing member have interengaging means for preventing lengthwise movement of said sealing member along said bracket.

3. A guttering assembly according to claim 1, wherein the adjacent ends of the lengths of guttering are spaced apart by a distance at least equal to the length of said other ear, said plastic member having a length greater than said other ear and having a smooth cylindrical underface overlying and engaging the adjacent ends of said lengths of guttering.

4. A guttering assembly comprising:
    a one-piece plastic union bracket comprising a channel-shaped seating portion having a channel opening therein, a wall plate portion for mounting said union bracket on a wall and a bracket member extending between said wall plate portion and said seating portion, said seating portion having opposite channel-shaped end portions, said end portions having channel openings therein larger than the channel opening of the central portion, said seating portion having a pair of inwardly extending lips extending substantially the entire length of the upper edges of said seating portion, downwardly extending ears extending downwardly from the inner ends of said lips, one of said ears extending the full length of its associated lip and defining therewith a first channel, the other ear extending only a part of the length of its associated lip at the central portion thereof and defining a second channel;
    a substantially channel-shaped plastic gasket seated in each end portion;
    two lengths of substantially channel-shaped plastic guttering extending into said seating portion at the opposite ends thereof and having their adjacent ends spaced apart by a distance at least equal to the length of said other ear, said lengths each overlying and sealingly contacting one of said gaskets and extending therebeyond into sliding contact with the central portion of said seating portion, one of the upper edges of said lengths of guttering extending into said first channel for being held in place thereby;
    a flexible plastic member of substantially channel-shaped cross section disposed within said central portion of said seating portion overlying and engaging the adjacent ends of said lengths of guttering and bridging the space therebetween, the upper edges of said plastic member extending to said channels with one edge thereof extending into one of said channels for retaining said plastic member in place; and
    interengaging means on the central portion of said seating portion and the central portion of said plastic member for preventing lengthwise movement of said plastic member along said bracket;
    said lengths of guttering being movable in a direction substantially transverse to the longitudinal axis of said guttering into engagement with said bracket with one edge thereof being positioned in said first channel and the other edge thereof being snapped into position under said other lip.

5. A guttering assembly according to claim 4, in which said one edge of the plastic member extends into said second channel, the other edge of said plastic member being positioned under the lip associated with said one ear but not extending into said first channel whereby said plastic member can be moved substantially transversely into engagement with said bracket and said lengths of guttering with said one edge thereof being positioned in said second channel and the other edge thereof being resiliently snapped into position under said lip associated with said one ear.

6. A method of joining opposing ends of two lengths of plastic guttering, which method comprises the steps of:
    placing the end portions of the lengths of plastic guttering into a plastic union bracket with each end portion engaging a plastic gasket positioned between said end portion and said bracket with said end portions being spaced from each other;
    securing each of said lengths to said bracket by moving said length in a direction substantially transverse to the longitudinal axis thereof whereby one edge is positioned within a channel formed along one edge of the bracket while the other lengthwise edge of the guttering is resiliently snapped into position under a lip formed on the other edge of said bracket;

placing a resilient plastic sealing member over said end portions and bridging the space therebetween with said sealing member being in sliding contact with said end portions; and then securing said sealing member to said union bracket by moving said sealing member in a direction substantially transverse to the longitudinal axis of said gutter whereby one edge thereof is received within a channel formed along one edge of said bracket and resiliently snapping the other edge of the sealing member into position underneath a lip formed on the other edge of said bracket.

References Cited

UNITED STATES PATENTS

| 3,253,415 | 5/1966 | Davidson | 52—11 X |
| 3,300,911 | 1/1967 | Riddell | 52—309 X |

FOREIGN PATENTS

| 250,556 | 3/1964 | Australia. |
| 841,369 | 7/1960 | Great Britain. |
| 876,470 | 9/1961 | Great Britain. |
| 914,903 | 1/1963 | Great Britain. |

FRANK L. ABBOTT, *Primary Examiner.*

C. G. MUELLER, *Assistant Examiner.*